US012594757B2

(12) United States Patent
Hoang

(10) Patent No.: US 12,594,757 B2
(45) Date of Patent: Apr. 7, 2026

(54) LIQUID EJECTION DEVICE AND DEFECTIVE NOZZLE DETERMINATION METHOD

(71) Applicant: SEIKO EPSON CORPORATION, Tokyo (JP)

(72) Inventor: Duc My Hoang, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 18/677,158

(22) Filed: May 29, 2024

(65) Prior Publication Data

US 2024/0399736 A1 Dec. 5, 2024

(30) Foreign Application Priority Data

May 31, 2023 (JP) ................................. 2023-089626

(51) Int. Cl.

| | |
|---|---|
| ***B41J 2/045*** | (2006.01) |
| ***B41J 2/14*** | (2006.01) |
| ***B41J 2/145*** | (2006.01) |
| ***B41J 2/165*** | (2006.01) |

(52) U.S. Cl.

CPC ......... *B41J 2/0451* (2013.01); *B41J 2/04571* (2013.01); *B41J 2/04573* (2013.01); *B41J 2/04581* (2013.01); *B41J 2/04588* (2013.01); *B41J 2/14233* (2013.01); *B41J 2/145* (2013.01); *B41J 2/165* (2013.01); *B41J 2/16579* (2013.01); *B41J 2002/14354* (2013.01)

(58) Field of Classification Search

CPC .. B41J 2/0451; B41J 2/04571; B41J 2/04573; B41J 2/04581; B41J 2/04588; B41J 2/14233; B41J 2/145; B41J 2/165; B41J 2/16579; B41J 2002/14354

See application file for complete search history.

(56) References Cited

U.S. PATENT DOCUMENTS

2022/0305770 A1* 9/2022 Orihara .................. B41J 2/0451
2023/0074947 A1* 3/2023 Owa .................... B41J 2/04571
2024/0157696 A1* 5/2024 Kondo ................... B41J 2/2132
2024/0336065 A1* 10/2024 Tokuda .................. B41J 2/1643

FOREIGN PATENT DOCUMENTS

JP 2022-149551 A 10/2022

* cited by examiner

*Primary Examiner* — Henok D Legesse
(74) *Attorney, Agent, or Firm* — WORKMAN NYDEGGER

(57) ABSTRACT

A liquid ejection device includes a liquid ejection head having a plurality of nozzles, a carriage on which the liquid ejection head is mounted, the carriage alternately executing a first movement, which is a movement in a first direction, and a second movement, which is a movement in a second direction opposite to the first direction; and a control section configured to control the liquid ejection head and the carriage, wherein the control section is configured to determine whether or not the nozzle is a defective nozzle based on vibration generated by applying a drive signal having a specific waveform, and is configured to apply the drive signal of the specific waveform in the deceleration and acceleration period that spans the first movement deceleration period and the second movement acceleration period.

5 Claims, 5 Drawing Sheets

LIQUID EJECTION DEVICE AND DEFECTIVE NOZZLE DETERMINATION METHOD

The present application is based on, and claims priority from JP Application Serial Number 2023-089626, filed May 31, 2023, the disclosure of which is hereby incorporated by reference herein in its entirety.

BACKGROUND

1. Technical Field

The present disclosure relates to a liquid ejection device and a defective nozzle determination method.

2. Related Art

An inkjet printer performs printing on a medium such as paper by ejecting liquid such as ink from each nozzle of a head having a plurality of nozzles while reciprocating a carriage on which the head is mounted along a predetermined main scanning direction. In such the inkjet printer, a defect may occur in liquid ejection by the nozzles due to clogging of the nozzles with solidified ink or dust. The nozzle in which a defect has occurred is called to as a defective nozzle. A defect may be referred to as an abnormality. In the related art, a process of determining whether or not a nozzle is a defective nozzle is performed (refer to JP-A-2022-149551).

According to JP-A-2022-149551, a method is disclosed in which a drive signal is supplied to piezoelectric elements provided corresponding to each of the nozzles, and the presence or absence of defects in the nozzles is determined based on so-called residual vibration generated after the piezoelectric elements are driven in accordance with the drive signal.

The movement of the carriage consists of an acceleration period for accelerating from a stopped state to a predetermined speed, a constant speed period for constant speed movement at the predetermined speed, and a deceleration period for decelerating from the state of constant speed movement until it stops. The acceleration period, the constant speed period, and the deceleration period are included in each of a forward movement and a return movement along a main scanning direction. Printing on a medium is executed mainly in the constant speed period in which the carriage passes over the medium. On the other hand, at the beginning of the acceleration period or at the end of the deceleration period, the carriage is positioned outside the medium. For this reason, in the related art, the inkjet printer determines the presence or absence of the defect of the nozzle based on the residual vibration described above by using either the acceleration period or the deceleration period of the carriage in association with the movement control of the carriage.

For a nozzle determined as a defective nozzle, the inkjet printer can complement missing dots on the medium by ejecting liquid using a nozzle at a position that can be substituted for the defective nozzle and that is near the defective nozzle or the like in subsequent printing. However, the head has a large number of nozzles. In the inkjet printer, since there is a limit in the processing capability of executing the process of generating the residual vibration and determining whether or not the nozzle is a defective nozzle based on the residual vibration, the determination can be performed only for a part of the nozzles in one movement of the carriage. Even though there is a defective nozzle, nozzles that are not subjected to the determination as to whether or not they are defective nozzles, become the cause of a decrease in printing quality because the missing dot by that defective nozzle is not compensated for in subsequent printing executed until the nozzle is subjected to the determination as to whether or not it is a defective nozzle.

In consideration of such a situation, an improvement is required for efficiently executing the process of determining the presence or absence of the defect of the nozzle.

SUMMARY

A liquid ejection device includes a liquid ejection head that is configured to eject liquid filling a pressure chamber from a nozzle by causing a pressure fluctuation in the pressure chamber by driving a piezoelectric element and that has a plurality of nozzles; a carriage on which the liquid ejection head is mounted, the carriage alternately executing a first movement, which is a movement in a first direction, and a second movement, which is a movement in a second direction opposite to the first direction; and a control section configured to control the liquid ejection head and the carriage, wherein the control section is configured to execute for each of the plurality of nozzles a defective nozzle determination process of determining whether or not a nozzle is a defective nozzle based on vibration generated by applying, to the piezoelectric element, a drive signal having a specific waveform different from a drive signal applied to the piezoelectric element in order to eject liquid from the nozzle and is configured to apply the drive signal of the specific waveform in a deceleration and acceleration period that spans a first movement deceleration period, which is a period in the first movement until the carriage decelerates from a predetermined constant speed movement state and stops, and a second movement acceleration period, which is a period after the first movement deceleration period and is a period until the carriage accelerates from a stopped state, starts the second movement, and enters the constant speed movement state.

A defective nozzle determination method executed by a liquid ejection device, the liquid ejection device including a liquid ejection head that is configured to eject liquid filling a pressure chamber from a nozzle by causing a pressure fluctuation in the pressure chamber by driving a piezoelectric element and that has a plurality of nozzles and a carriage on which the liquid ejection head is mounted, the carriage alternately executing a first movement, which is a movement in a first direction, and a second movement, which is a movement in a second direction opposite to the first direction; the defective nozzle determination method includes executing for each of the plurality of nozzles a defective nozzle determination process of determining whether or not a nozzle is a defective nozzle based on vibration generated by applying, to the piezoelectric element, a drive signal having a specific waveform different from a drive signal applied to the piezoelectric element in order to eject liquid from the nozzle and applying the drive signal of the specific waveform in a deceleration and acceleration period that spans a first movement deceleration period, which is a period in the first movement until the carriage decelerates from a predetermined constant speed movement state and stops, and a second movement acceleration period, which is a period after the first movement deceleration period and is a period until the carriage accelerates from a stopped state, starts the second movement, and enters the constant speed movement state.

DESCRIPTION OF EMBODIMENTS

Hereinafter, embodiments of the present disclosure will be described with reference to the drawings. Note that the drawings are merely examples for describing the present embodiment. Since each drawing is an example, ratios, shapes, or shading may not be accurate, may not match each other, or may be partially omitted.

Figure 1:
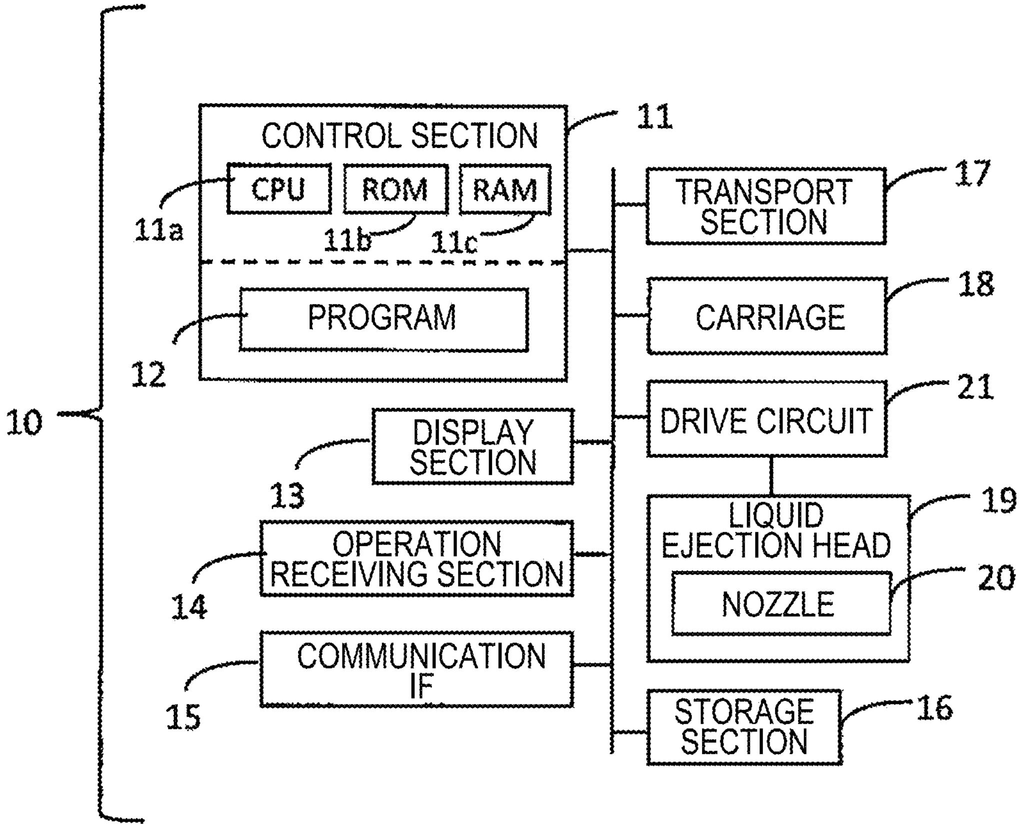
FIG. 1 is a diagram simply showing a device configuration.

FIG. 1 simply shows the configuration of a liquid ejection device 10 according to the present embodiment. The liquid ejection device 10 includes a control section 11, a display section 13, an operation receiving section 14, a communication IF 15, a storage section 16, a transport section 17, a carriage 18, a liquid ejection head 19, a drive circuit 21, and the like. IF is an abbreviation for interface. The control section 11 is configured to include one or a plurality of ICs having a CPU 11*a* as a processor, a ROM 11*b*, a RAM 11*c*, and the like, and other nonvolatile memory, and the like.

In the control section 11, the processor, that is, the CPU 11*a* executes arithmetic processing according to one or more programs 12 stored in the ROM 11*b*, another memory, or the like by using the RAM 11*c* or the like as a work area, thereby controlling the liquid ejection device 10. Note that the processor is not limited to a single CPU, and may be configured to perform processing by a plurality of CPUs or a hardware circuit such as an ASIC, or may be configured to perform processing in cooperation with a CPU and a hardware circuit.

The display section 13 is a section for displaying visual information, and is configured by, for example, a liquid crystal display, an organic EL display, or the like. The display section 13 may have a configuration including a display and a drive circuit for driving the display. The operation receiving section 14 is a unit for receiving an operation by a user, and is realized by, for example, a physical button, a touch panel, a mouse, a keyboard, or the like. Of course, the touch panel may be realized as one function of the display section 13.

The communication IF 15 is a general term for one or a plurality of IFs for the liquid ejection device 10 to be connected to an external device by wire or wirelessly in accordance with a predetermined communication protocol including a known communication standard. The external device is, for example, various communication devices such as a personal computer, a server, a smartphone, and a tablet terminal.

The storage section 16 is, for example, constituted by a storage device such as a hard disk drive or a solid state drive. The storage section 16 may be a part of the memory of the control section 11. The storage section 16 may be regarded as a part of the control section 11. The storage section 16 stores various kinds of information necessary for controlling the liquid ejection device 10.

The transport section 17 is a section for transporting a medium in a predetermined transport direction and includes a rotating roller and a motor for rotating the roller or the like. Hereinafter, upstream and downstream of transport are simply referred to as upstream and downstream. The medium is typically a sheet of paper, but in addition to paper, various materials, such as fabric and film, which can be a target of printing or recording with liquid, can be adopted as the medium. The transport direction is also referred to as a sub scanning direction. The transport section 17 may be a mechanism for transporting the medium by placing on a belt or a pallet.

The carriage 18 is capable of reciprocating movement along a predetermined main scanning direction by receiving power from a carriage motor (not shown). The main scanning direction and the transport direction intersect each other. The intersection between the main scanning direction and the transport direction may be understood to be orthogonal or substantially orthogonal. The carriage 18 is equipped with the liquid ejection head 19. Therefore, the liquid ejection head 19 performs reciprocating movement along the main scanning direction together with the carriage 18. The movement of the liquid ejection head 19 and the movement of the carriage 18 have the same meaning.

The liquid ejection head 19 has a plurality of nozzles 20 capable of ejecting liquid. The drive circuit 21 for driving each nozzle 20 under control of the control section 11 is connected to the liquid ejection head 19. The nozzle 20 ejects a dot which is a droplet. The liquid ejection head 19 performs liquid ejection based on print data for printing an image. As is known, the control section 11 controls application of a signal to the piezoelectric element included in each of the nozzles 20 via the drive circuit 21 in accordance with print data, thereby printing the image on the medium by causing or not causing the dots to be ejected from each of the nozzles 20. The drive circuit 21 may be regarded as a part of the control section 11. The liquid ejection head 19 can eject each color of ink such as cyan (C) ink, magenta (M) ink, yellow (Y) ink, and black (K) ink. Of course, the color of the ink ejected by the liquid ejection head 19 is not limited to CMYK. The liquid ejection head 19 can eject various liquids including ink and liquids not corresponding to ink.

Figure 2:
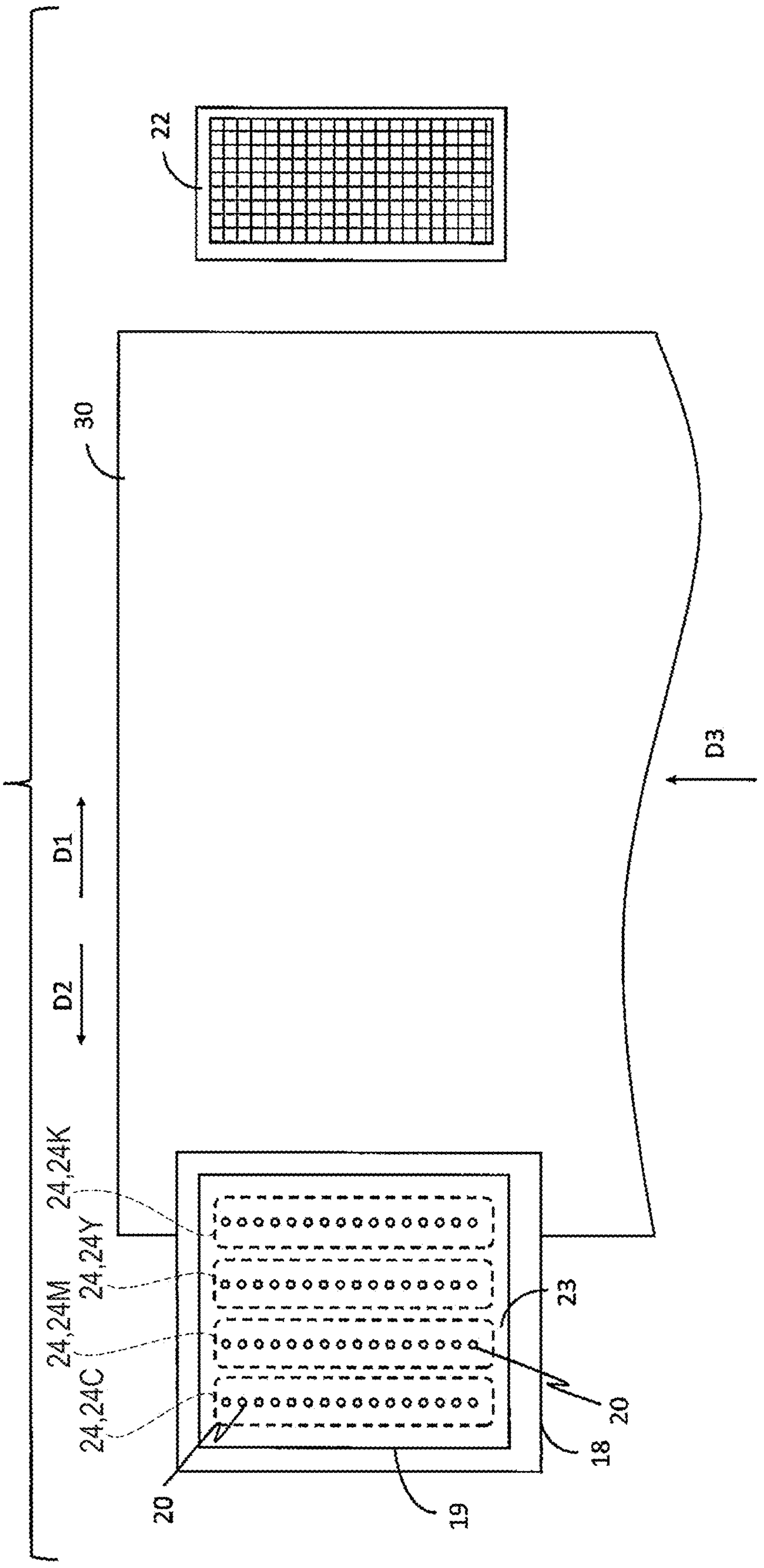
FIG. 2 is a view showing the relationship between the medium and the liquid ejection head from an upward viewpoint.

FIG. 2 simply shows the relationship between a medium 30 and the liquid ejection head 19 from an upward viewpoint. The carriage 18 on which the liquid ejection head 19 is mounted alternately performs a "first movement" which is a movement in a first direction D1 and a "second movement" which is a movement in a second direction D2 opposite to the first direction D1. That is, the first direction D1 and the second direction D2 correspond to the main scanning direction. It does not matter which of the first movement and the second movement is regarded as a forward movement. For example, the first movement is regarded as the forward movement of the carriage 18, and the second movement is regarded as a return movement of the carriage 18. A direction D3, which intersects the first direction D1 and the second direction D2 is a transport direction D3 of the medium 30 by the transport section 17.

FIG. 2 shows an example of the arrangement of the nozzles 20 on a nozzle surface 23. The nozzle surface 23 is a lower surface of the liquid ejection head 19 and is a surface facing the medium 30. The individual small circles in the nozzle surface 23 represent individual nozzles 20. The liquid ejection head 19 includes a nozzle row 24 for each ink color in a configuration in which ink of each color is supplied from a liquid container (not shown) called an ink cartridge, an ink tank, or the like and is ejected from the nozzles 20. FIG. 2 shows an example of the liquid ejection head 19 that ejects CMYK ink.

The nozzle row 24 including the nozzles 20 for ejecting the C ink is a nozzle row 24C. Similarly, the nozzle row 24 including the nozzles 20 for ejecting the M ink is a nozzle row 24M, the nozzle row 24 including the nozzles 20 for ejecting the Y ink is the nozzle row 24Y, and the nozzle row 24 including the nozzles 20 for ejecting the K ink is the nozzle row 24K. In the example of FIG. 2, the nozzle rows 24C, 24M, 24Y, and 24K are arranged along the directions D1 and D2. The nozzle rows 24 for all color are disposed at the same position in the transport direction D3. A single nozzle row 24 is composed of a plurality of nozzles 20 in which a nozzle interval, which is the interval between nozzles 20 in the transport direction D3, is constant or substantially constant.

An operation in which the liquid ejection head 19 ejects the liquid together with the first movement and the second movement of the carriage 18 is referred to as a main scanning or pass. An operation in which the transport section 17 transports the medium 30 from the upstream side to the downstream side by a predetermined distance between passes is referred to as paper feed. The control section 11 controls the liquid ejection head 19, the carriage 18, and the transport section 17 to execute a pass and a paper feed, thereby it can print a two dimensional image on the medium 30.

The liquid ejection device 10 has a maintenance box 22 for receiving and storing waste liquid ejected by the liquid ejection head 19. The maintenance box 22 is hereinafter abbreviated as an MTB 22. The MTB 22 is disposed at a predetermined position within the movement range of the liquid ejection head 19 by the carriage 18 and outside the print area through which the medium 30 passes. In the example of FIG. 2, the MTB 22 is disposed forward from the print area corresponding to the medium 30 in the first direction D1. The control section 11 causes the liquid ejection head 19 to execute so-called flushing at a timing when the liquid ejection head 19 is over the MTB 22.

Flushing is a type of maintenance of the liquid ejection head 19, and clogged nozzles 20 are improved by forcing the nozzles 20 to perform liquid ejection operations. The MTB 22 receives the liquid ejected by the flushing. In the example of FIG. 2, in order to suppress an increase in the size of the device, the width of the MTB 22 is designed to be smaller than the width of the liquid ejection head 19 in the main scanning direction. Therefore, the liquid ejection head 19 performs flushing of each nozzle row 24 at a timing at which each nozzle row 24 passes over the MTB 22 during the movement by the carriage 18.

The configuration of the liquid ejection device 10 shown in FIG. 1 may be realized by one printer or may be realized by a plurality of devices connected to each other so as to be able to communicate with each other. In other words, the liquid ejection device 10 may actually be a liquid ejection system 10. The liquid ejection system 10 includes, for example, a control device functioning as the control section 11, and the printer having the transport section 17, the carriage 18, the liquid ejection head 19, the drive circuit 21, and the like. The liquid ejection device 10 or the liquid ejection system 10 realizes a liquid ejection method or a defective nozzle determination method.

Figure 3:
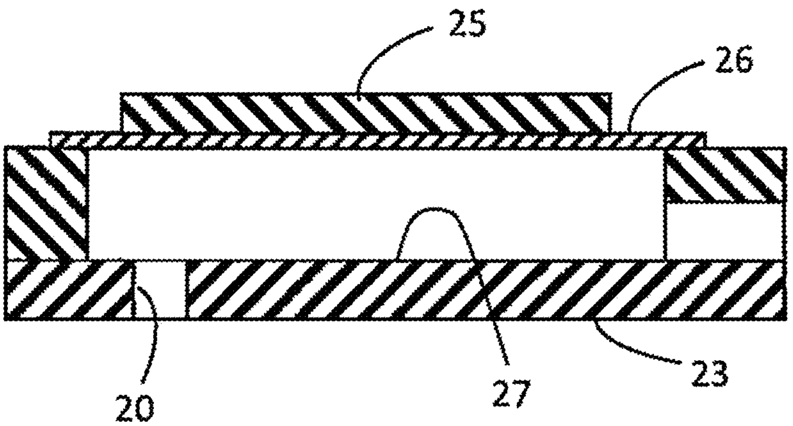
FIG. 3 is a cross-sectional view simply showing a structure including one nozzle and a piezoelectric element corresponding to the nozzle.

FIG. 3 is a part of the internal structure of the liquid ejection head 19, and simply exemplifies a structure including one nozzle 20 and a piezoelectric element 25 corresponding to the one nozzle 20 by a cross-sectional view. The structure is formed of a plurality of layers. Of course, the structure including the nozzle 20 and the piezoelectric element 25 corresponding to the nozzle 20 need not be as shown in FIG. 3 because various specific examples are known. The nozzle 20 opening to the nozzle surface 23 communicates with a pressure chamber 27 inside the liquid ejection head 19. Although not shown, the pressure chamber 27 is filled with the liquid such as ink. One of the wall surfaces surrounding the pressure chamber 27 is a diaphragm 26, and the piezoelectric element 25 is provided on a surface of the diaphragm 26 that is opposite to the pressure chamber 27. The piezoelectric element 25 of FIG. 3 may be understood as an actuator including a piezoelectric element and electrodes attached to drive the piezoelectric element.

When a drive signal is applied to the piezoelectric element 25 via the drive circuit 21 as described above under the control of the control section 11, the piezoelectric element 25 is deformed, the diaphragm 26 is bent, and pressure fluctuation occurs in the pressure chamber 27. The liquid is pushed out from the pressure chamber 27 according to the pressure fluctuation, and the dot of the liquid is ejected to the outside of the nozzle surface 23 through the nozzle 20.

The control section 11 can execute a defective nozzle determination process of determining whether or not the nozzle 20 is a defective nozzle based on the vibration generated by applying, to the piezoelectric element 25, the drive signal having the “specific waveform” different from the drive signal applied to the piezoelectric element 25 in order to eject liquid from the nozzle 20 for each of the plurality of nozzles 20. Here, the vibration is so-called residual vibration, and for example, the diaphragm 26 vibrates after the piezoelectric element 25 is driven by applying the drive signal having the specific waveform to the piezoelectric element 25. The control section 11 determines whether or not the nozzle 20 is a defective nozzle by evaluating characteristics, such as the frequency of a residual vibration signal generated in the piezoelectric element 25 according to such the residual vibration, based on a predetermined reference. Since a method of determining whether or not the nozzle is a defective nozzle based on the residual vibration is known, a detailed description thereof will be omitted here.

In the present embodiment, the control section 11 applies the drive signal the specific waveform in a “deceleration and acceleration period” that spans “first movement deceleration period”, which is a period until the carriage 18 in the first movement decelerates from a predetermined constant speed movement state and stops, and a “second movement acceleration period”, which is a period after the first movement deceleration period and is a period until the carriage 18 accelerates from a stopped state and starts the second movement and enters the constant speed movement state.

Figure 4:
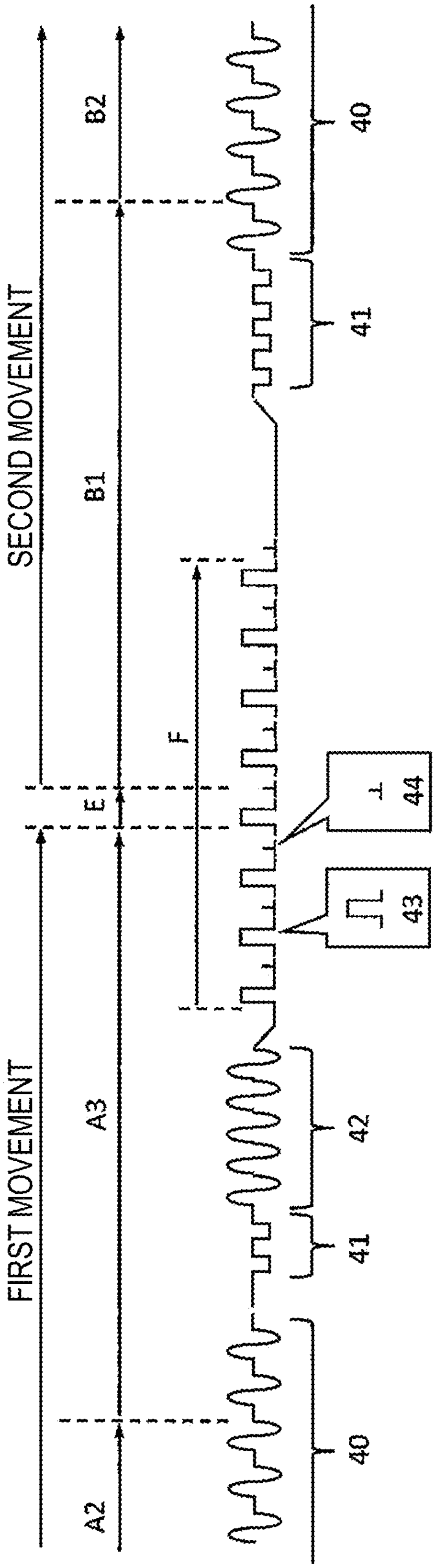
FIG. 4 is a diagram simply showing various drive signals applied to each piezoelectric element in a present embodiment.

FIG. 4 is a diagram for explaining such a feature of the present embodiment, and simply shows various drive signals applied from the drive circuit 21 to each piezoelectric element 25 under the control of the control section 11. FIG. 4 shows a part of a period of the first movement of the carriage 18 and a part of a period of the second movement of the carriage 18 after the first movement. A period E between the first movement and the second movement is a stop period E in which the carriage 18 is stopped. After the carriage 18 completes the first movement and before the second movement is started, the speed of the carriage 18 is necessarily zero. Therefore, even though to the user, it may seem as though the time in which the carriage 18 is stopped between the first movement and the second movement or between the second movement and the first movement is substantially zero, the stop period E is not strictly zero.

A period A2 included in the first movement is a constant speed period A2 in which the carriage 18 moves at a constant speed. Of course, even though the speed is said to be constant, this does not necessarily mean that the speed is strictly constant, and there may be minor speed fluctuations. A last period A3 included in the first movement is a deceleration period A3 until the carriage 18 decelerates from the constant speed movement state and stops. That is, the deceleration period A3 corresponds to the first movement deceleration period. A first period B1 included in the second movement is an acceleration period B1 during which the carriage 18 accelerates from the stop state to start the second movement and reach the constant speed movement state. That is, the acceleration period B1 corresponds to the second movement acceleration period. A period B2 included in the second movement is a constant speed period B2 in which the carriage 18 moves at a constant speed.

A printing waveform 40 indicated by a reference symbol 40 is a waveform of the drive signal applied to the piezoelectric element 25 in order to eject the liquid from the nozzle 20, and by applying such a printing waveform 40, the pass by the first movement, that is, the printing on the medium 30 is executed. The period during which the printing waveform 40 is applied to the piezoelectric element 25 in the first movement is basically the constant speed period A2, but it is applied for a while even after entering the deceleration period A3 from the constant speed period A2.

A minute vibration waveform 41 indicated by reference symbol 41 is a waveform of the drive signal applied to the piezoelectric element 25 to generate a predetermined minute vibration, and when the minute vibration waveform 41 is applied, minute vibration is generated in the nozzle 20, the pressure chamber 27, and the like, thereby suppressing an increase in the viscosity of the ink. The minute vibration waveform 41 is not a waveform for ejecting the liquid from the nozzle 20. In the first movement, the minute vibration waveform 41 is applied within the deceleration period A3 after the period during which the printing waveform 40 is applied to the piezoelectric element 25.

An FL-waveform 42 indicated by reference symbol 42 is a waveform of a drive signal applied to the piezoelectric element 25 for flushing, and when the FL-waveform 42 is applied, flushing for forcibly ejecting the liquid from the nozzle 20 is executed. In the first movement, the FL-waveform 42 is applied within the deceleration period A3 after the period during which the minute vibration waveform 41 is applied to the piezoelectric element 25. As can be understood from the description of FIG. 2, the FL-waveform 42 is applied to the piezoelectric element 25 at a timing when the carriage 18 passes over the MTB 22 in the deceleration period A3 of the first movement.

A test waveform 43 indicated by reference symbol 43 is a waveform of the drive signal applied to the piezoelectric element 25 to generate residual vibration, and corresponds to the "specific waveform" described above. The test waveform 43 drives the piezoelectric element 25 to such an extent that the liquid is not ejected from the nozzle 20 and generates residual vibration. A residual vibration waveform 44 indicated by reference symbol 44 indicates the waveform of the residual vibration signal generated in the piezoelectric element 25 according to the residual vibration generated after the test waveform 43 is applied to the piezoelectric element 25, and is used in the defective nozzle determination process as described above.

In the first movement, the test waveform 43 is applied in the deceleration period A3 after the period during which the FL-waveform 42 is applied to the piezoelectric element 25. Further, as shown in FIG. 4, the test waveform 43 is continuously applied even in the stop period E after the deceleration period A3, and in the acceleration period B1 of the second movement. A continuous period F, which spans a part of the deceleration period A3, the stop period E, and a part of the acceleration period B1, is a deceleration and acceleration period F that spans the deceleration period A3 and the acceleration period B1. That is, in the present embodiment, since such a deceleration and acceleration period F is the application period of the test waveform 43, the control section 11 can perform the defective nozzle determination process on the plurality of nozzles 20 corresponding to this period.

In the acceleration period B1 of the second movement, after the deceleration and acceleration period F, the minute vibration waveform 41 is applied to the piezoelectric element 25. The application of the minute vibration waveform 41 at this timing can be said to be a preparatory operation necessary for smoothly starting subsequent printing. After the application of the minute vibration waveform 41, the application of the printing waveform 40 is started from the final stage of the acceleration period B1 of the second movement, and the period shifts to the constant speed period B2 of the second movement. In this way, the pass by the second movement, that is, the printing on the medium 30 is executed. Needless to say, each waveform and the number of waveforms shown in FIG. 4 are merely examples and are not the same as actual ones.

Figure 5A:
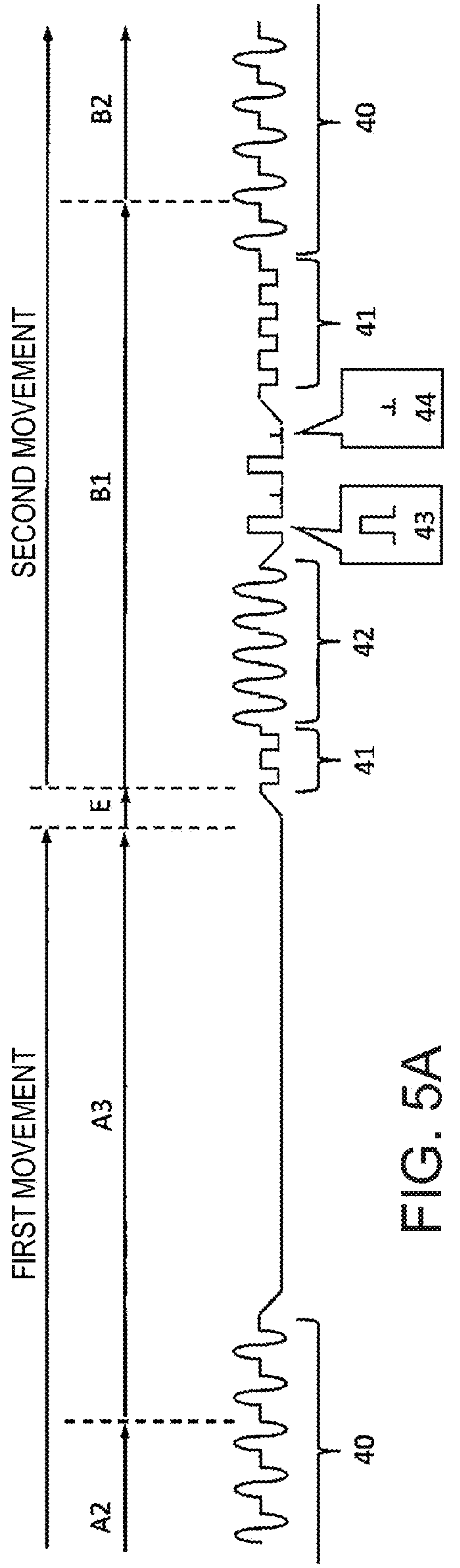
FIGS. 5A and 5B are diagrams simply showing a related technique to be compared with the present embodiment.
Figure 5B:
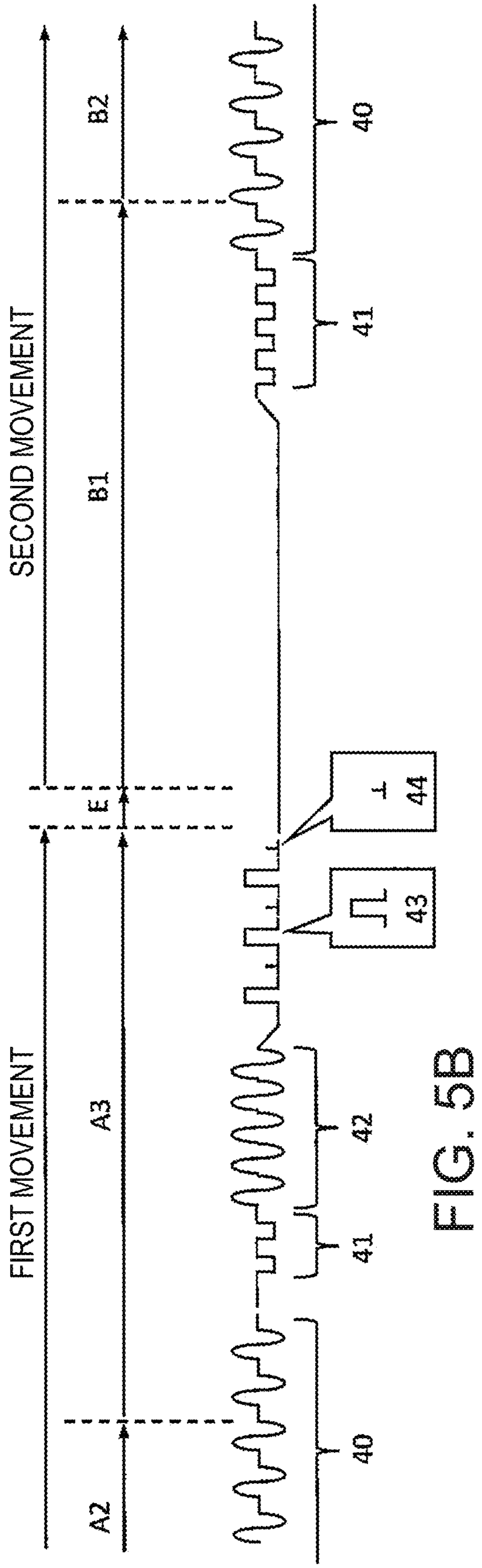

FIGS. 5A and 5B show the prior art and simply show the various drive signals applied to the piezoelectric elements. Since the way of viewing FIGS. 5A and 5B is the same as the way of viewing FIG. 4, the description common to FIG. 4 will be omitted. In the liquid ejection device of the related art, the execution timing of the flushing and defective nozzle determination processing is controlled in association with either the deceleration period A3 of the first movement or the acceleration period B1 of the second movement.

According to FIG. 5A, from the start of the acceleration period B1 of the second movement, the application of the minute vibration waveform 41, the application of the FL-waveform 42, and the application of the test waveform 43 are executed in order. Before the application of the printing waveform 40 in the second movement, it is necessary to secure a period in which the minute vibration waveform 41 is applied as a preparatory operation. Therefore, the period in the acceleration period B1 of the second movement in which the test waveform 43 is applied to the piezoelectric elements and the defective nozzle determination process can be executed is considerably limited. By increasing the distance at which the carriage 18 accelerates, it is possible to secure a longer acceleration period B1 to also lengthen the period for applying the test waveform 43. However, in this case, the problem of increasing the size of the device occurs.

On the other hand, according to FIG. 5B, in the deceleration period A3 of the first movement, after the printing is finished, the application of the minute vibration waveform 41, the application of the FL-waveform 42, and the application of the test waveform 43 are executed in order, and the application of the test waveform 43 is also finished with the stop of the carriage 18. Therefore, the time period in which the test waveform 43 is applied to the piezoelectric elements and in which the defective nozzle determination process can be executed is also limited in the example of FIG. 5B.

According to the present embodiment, the liquid ejection device 10 includes the liquid ejection head 19 that is configured to eject liquid filling the pressure chamber 27 from the nozzle 20 by causing a pressure fluctuation in the pressure chamber 27 by driving the piezoelectric element 25 and that has the plurality of nozzles 20; the carriage 18 on which the liquid ejection head 19 is mounted, the carriage 18 alternately executing the first movement, which is a movement in the first direction, and the second movement, which is a movement in the second direction opposite to the first direction, and the control section 11 configured to control the liquid ejection head 19 and the carriage 18.

The control section 11 is configured to execute for each of the plurality of nozzles 20 a defective nozzle determination process of determining whether or not a nozzle 20 is a defective nozzle based on vibration generated by applying, to the piezoelectric element 25, a drive signal having a specific waveform different from a drive signal applied to the piezoelectric element 25 in order to eject liquid from the nozzle 20 and is configured to apply the drive signal of the specific waveform in a deceleration and acceleration period F that spans a first movement deceleration period, which is a period in the first movement until the carriage 18 decelerates from a predetermined constant speed movement state and stops, and a second movement acceleration period, which is a period after the first movement deceleration period and is a period until the carriage 18 accelerates from a stopped state, starts the second movement, and enters the constant speed movement state.

According to such a configuration, the control section 11 uses the deceleration and acceleration period F that spans the first movement deceleration period and the second movement acceleration period of the carriage 18, performs the application of the drive signal of the specific waveform to the piezoelectric element 25, it is possible to perform the defective nozzle determination process. That is, although printing is performed on the medium 30 by alternately repeating the first movement and the second movement of the carriage 18 on which the liquid ejection head 19 is mounted, it is possible to increase the number of nozzles that are targets of the defective nozzle determination process per one first movement and one second movement compared to the related art, and it is possible to increase the efficiency of the defect presence/absence determination of the nozzle 20 compared to the related art. As a result, the control section 11 can recognize the defective nozzle as quickly as possible with respect to the nozzle 20 that is the defective nozzle, and execute the above described complementation in a subsequent pass to improve the print quality.

The present embodiment will be further described.

The control section 11 may set a length of a period in which the drive signal of the specific waveform is applied during one time of the second movement acceleration period based on a minimum value of the second movement acceleration period calculated in advance according to an acceleration error of the carriage 18.

The first movement and the second movement of the carriage 18 attempts to achieve ideal speeds by the control section 11 feedback controlling the carriage motor based on a predetermined speed table. Therefore, the length of the acceleration period, the constant speed period, and the deceleration period in one first movement and in one second movement are also determined in the design. However, an error may occur in the acceleration and deceleration of the carriage 18 due to an individual difference of the liquid ejection device 10, an installation location of the liquid ejection device 10, inclination of the posture, or the like. Therefore, an error that may occur in the acceleration of the carriage 18 is assumed based on various factors, and the minimum value of the second movement acceleration period is calculated according to the assumed error.

As an example, it is assumed that the length of the second movement acceleration period from the state of the speed zero, necessary to reach a predetermined speed in constant speed movement is 1.0 seconds in design, and the minimum value of the length of the second movement acceleration period calculated as described above is 0.8 seconds. It is assumed that the application of the minute vibration waveform 41 in the acceleration period B1 of the second movement shown in FIG. 4 needs to be executed, for example, from 0.3 seconds before the end of the acceleration period B1. Then, if the length of the acceleration period B1 is 1.0 seconds, there is a margin of 0.7 seconds before starting the application of the minute vibration waveform 41. However, when the length of the acceleration period B1 is a minimum value of 0.8 seconds, there is only a margin of 0.5 seconds before starting the application of the minute vibration waveform 41. In the acceleration period B1, the application of the test waveform 43 needs to be finished before the application of the minute vibration waveform 41 is started.

Considering such a situation, the control section 11 sets the length of the period for applying the drive signal of the test waveform 43 during one acceleration period B1 to, for example, 0.5 seconds from the start of the acceleration period B1, based on the minimum value of the length of the acceleration period B1, for example, 0.8 seconds, and executes it accordingly. According to such a configuration, it is possible to avoid a situation in which the application period of the test waveform 43 in the acceleration period B1 of the second movement interferes with the application period of the minute vibration waveform 41, so that the application period of the minute vibration waveform 41 cannot be appropriately secured.

The liquid ejection head 19 has n rows of nozzle rows 24 arranged in a third direction D3 in which the plurality of nozzles 20 intersect the first direction D1 and the second direction D2.

Each of n and m is an integer of 2 or more. Although n is 4 in the example of FIG. 2, it may be any value other than 4.

When applying the drive signal of the specific waveform to the plurality of piezoelectric elements 25 corresponding to the plurality of nozzles 20 of m rows of the nozzle rows 24, which is less than the n rows, in one deceleration and acceleration period F, the control section 11 may make the frequency of applying the drive signal of the specific waveform to the piezoelectric element 25 different between a nozzle row 24 for ejecting ink of a first color as liquid and a nozzle row 24 for ejecting ink of a second color, which is different from the first color.

As an example, it is assumed that n=12 and m=5. When it is assumed that the liquid ejection head 19 has 12 rows of nozzle rows 24, the 12 rows of nozzle rows 24 may eject ink of different colors, or, for example, two rows of nozzle rows 24 may be assigned to one color to eject ink in a total of six colors. Then, the control section 11 can, as the processing capability including the drive circuit 21 and the like, apply the test waveform 43 to the plurality of piezoelectric elements 25 corresponding to the plurality of nozzles 20 of the five nozzle rows 24 during one deceleration and acceleration period F.

In such a specific example, in order to perform the defective nozzle determination process for all 12 rows of nozzle row 24, the deceleration and acceleration period F must be 3 times or, in terms of the number of passes, 6 passes. On the other hand, if there are three deceleration and acceleration periods F, it is possible to perform the defective nozzle determination process on the nozzle rows 24 of 3×5=15 rows, at the most. Therefore, the control section 11 applies the test waveform 43 to the piezoelectric element 25 at a higher frequency for the nozzle row 24 that ejects the first color, for example, the K ink, in which the influence on the image quality of a dot missing due to a defective nozzle is relatively larger than for a nozzle row 24 that ejects ink of another color (second color). That is, in the three deceleration and acceleration periods F, the test waveform 43 is applied to the piezoelectric element 25 in each of the two deceleration and acceleration periods F for the nozzle row 24 that ejects K ink, and the test waveform 43 is applied to the piezoelectric element 25 in any one of the three deceleration and acceleration periods F for each of the nozzle rows 24 ejecting the other color inks. According to such a configuration, the control section 11 varies the frequency of applying the drive signal of the specific waveform to the piezoelectric element 25 in accordance with the color of the ink, so that the characteristics of the ink are taken into consideration and the print quality can be more appropriately maintained.

The control section 11 may increases the number of times of applying the drive signal of the specific waveform during a stop period E, in which the carriage 18 is stopped and which is included in the deceleration and acceleration period F, when the stop period E is a second length, which is longer than a first length, to a number of times greater than a number of times of applying the drive signal of the specific waveform during a stop period E when the stop period E is the first length.

The length of the stop period E varies depending on various conditions. As described above, there is a case where the stop period E is set to substantially zero in terms of how the user senses it. Alternatively, there is a case where the stop period E is set to several seconds or several tens of seconds in combination with an ink drying time desired by the user or the time for waiting for the completion of the paper feeding. The setting of the stop period E also varies depending on the type of the medium 30 used for printing. In any case, the control section 11 acquires the setting of the stop period E in the printing process and, according to its length, changes the number of times it applies the test waveform 43 during the stop period E, that is, the number of nozzles which are targets of the defective nozzle determination process. Basically, the longer the stop period E is, more the number of times the test waveform 43 is applied during the stop period E is increased.

As can be understood from the above description, the length of the period in which the test waveform 43 can be applied corresponds to the number of times the test waveform 43 is applied, that is, the number of nozzles to be subjected to the defective nozzle determination process.

Although only a part of the combinations of claims is described in the scope of claims, the present embodiment naturally includes not only one to one combinations of independent claims and dependent claims, but also various combinations of the plurality of dependent claims in the scope of the disclosure.

In addition to the liquid ejection device 10, the present embodiment discloses each category such as a method including processes or steps executed by the liquid ejection device 10 and a program 12 for realizing the method in cooperation with a processor.

For example, a defective nozzle determination method, which is executed by the liquid ejection device 10, includes the liquid ejection head 19 that is configured to eject liquid filling the pressure chamber 27 from the nozzle 20 by causing a pressure fluctuation in the pressure chamber 27 by driving the piezoelectric element 25 and that has the plurality of nozzles 20 and the carriage 18 on which the liquid ejection head 19 is mounted, the carriage 18 alternately executing the first movement, which is a movement in the first direction, and the second movement, which is a movement in the second direction opposite to the first direction.

The method includes executing for each of the plurality of nozzles 20 a defective nozzle determination process of determining whether or not a nozzle 20 is a defective nozzle based on vibration generated by applying, to the piezoelectric element 25, a drive signal having a specific waveform different from a drive signal applied to the piezoelectric element 25 in order to eject liquid from the nozzle 20 and applying the drive signal of the specific waveform in a deceleration and acceleration period F that spans a first movement deceleration period, which is a period in the first movement until the carriage 18 decelerates from a predetermined constant speed movement state and stops, and a second movement acceleration period, which is a period after the first movement deceleration period and is a period until the carriage 18 accelerates from a stopped state, starts the second movement, and enters the constant speed movement state.

What is claimed is:

1. A liquid ejection device comprising:

a liquid ejection head that is configured to eject liquid filling a pressure chamber from a nozzle by causing a pressure fluctuation in the pressure chamber by driving a piezoelectric element and that has a plurality of nozzles;

a carriage on which the liquid ejection head is mounted, the carriage alternately executing a first movement, which is a movement in a first direction, and a second movement, which is a movement in a second direction opposite to the first direction; and a control section configured to control the liquid ejection head and the carriage, wherein the control section is configured to execute for each of the plurality of nozzles a defective nozzle determination process of determining whether or not a nozzle is a defective nozzle based on vibration generated by applying, to the piezoelectric element, a drive signal having a specific waveform different from a drive signal applied to the piezoelectric element in order to eject liquid from the nozzle and is configured to apply the drive signal of the specific waveform in a deceleration and acceleration period that spans a first movement deceleration period, which is a period in the first movement until the carriage decelerates from a predetermined constant speed movement state and stops, and a second movement acceleration period, which is a period after the first movement deceleration period and is a period until the carriage accelerates from a stopped state, starts the second movement, and enters the constant speed movement state.

2. The liquid ejection device according to claim 1, wherein the control section is configured to set a length of a period in which the drive signal of the specific waveform is applied during one time of the second movement acceleration period based on a minimum value of the second movement acceleration period calculated in advance according to an acceleration error of the carriage.

3. The liquid ejection device according to claim 1, wherein the liquid ejection head includes n nozzle rows in which the plurality of nozzles are arranged in a third direction, which intersects the first direction and the second direction and the control section is configured to, when applying the drive signal of the specific waveform to the plurality of piezoelectric elements corresponding to the plurality of nozzles of m rows of the nozzle rows, which is less than the n rows, in one deceleration and acceleration period, make the frequency of applying the drive signal of the specific waveform to the piezoelectric element different between a nozzle row for ejecting ink of a first color as liquid and a nozzle row for ejecting ink of a second color, which is different from the first color.

4. The liquid ejection device according to claim 1, wherein the control section increases the number of times of applying the drive signal of the specific waveform during a stop period, in which the carriage is stopped and which is included in the deceleration and acceleration period, when the stop period is a second length, which is longer than a first length, to a number of times greater than a number of times of applying the drive signal of the specific waveform during a stop period when the stop period is the first length.

5. A defective nozzle determination method executed by a liquid ejection device, the liquid ejection device including a liquid ejection head that is configured to eject liquid filling a pressure chamber from a nozzle by causing a pressure fluctuation in the pressure chamber by driving a piezoelectric element and that has a plurality of nozzles and a carriage on which the liquid ejection head is mounted, the carriage alternately executing a first movement, which is a movement in a first direction, and a second movement, which is a movement in a second direction opposite to the first direction;

the defective nozzle determination method comprising:

executing for each of the plurality of nozzles a defective nozzle determination process of determining whether or not a nozzle is a defective nozzle based on vibration generated by applying, to the piezoelectric element, a drive signal having a specific waveform different from a drive signal applied to the piezoelectric element in order to eject liquid from the nozzle and applying the drive signal of the specific waveform in a deceleration and acceleration period that spans a first movement deceleration period, which is a period in the first movement until the carriage decelerates from a predetermined constant speed movement state and stops, and a second movement acceleration period, which is a period after the first movement deceleration period and is a period until the carriage accelerates from a stopped state, starts the second movement, and enters the constant speed movement state.

* * * * *